United States Patent [19]

Kaplan

[11] 4,135,474

[45] Jan. 23, 1979

[54] BELL ACTUATING MECHANISM

[76] Inventor: Ruth Kaplan, 91 Schoolhouse La., Roslyn Heights, N.Y. 11577

[21] Appl. No.: 833,420

[22] Filed: Sep. 15, 1977

[51] Int. Cl.[2] .................... G01K 1/10

[52] U.S. Cl. .................... 116/155; 58/21.13; 116/95

[58] Field of Search .................... 116/161, 155, 95; 58/21.13, 21.1, 22.7

[56] References Cited

U.S. PATENT DOCUMENTS

| | | | |
|---|---|---|---|
| 473,879 | 4/1892 | Iske | 116/161 |
| 491,328 | 2/1893 | Winger | 58/21.13 |
| 578,059 | 3/1897 | Hallas | 58/21.13 |
| 912,516 | 2/1909 | Wheeler | 58/21.13 |
| 1,068,395 | 7/1913 | Schaumburg | 58/21.13 |
| 2,583,245 | 1/1952 | Valkenburgh et al. | 58/21.13 X |
| 3,827,232 | 8/1974 | Bassett | 58/21.13 |
| 4,020,625 | 5/1977 | Mahon et al. | 58/21.13 |

FOREIGN PATENT DOCUMENTS

| | | | |
|---|---|---|---|
| 124305 | 3/1919 | United Kingdom | 58/21.13 |

*Primary Examiner*—Daniel M. Yasich
*Attorney, Agent, or Firm*—C. Bruce Hamburg

[57] ABSTRACT

In the combination of a spring driven motor having a winding shaft which rotates less than one complete revolution during the unwinding of the motor from a fully wound condition, escapement means for permitting the motor to unwind at a controlled rate and a bell to be struck immediately proximate to completion of unwinding of the motor, there is provided an improved bell actuating mechanism. The bell actuating mechanism comprises a bell post coaxially mounted at one of its ends on the winding shaft for rotation with the winding shaft, means coaxially mounting a gong bell onto the other end of the bell post for rotation with the bell post and the winding shaft, a hammer for striking the bell, a spring mounting the hammer immediately adjacent to an inner surface of the bell, an arm integral with and extending outwardly from the bell post for rotation with the bell post and the winding shaft, the path of movement of the arm intersecting the hammer and the hammer being rotationally so positioned relative to the axis of the winding shaft and the bell post that the arm engages the hammer as the unwinding of the motor is completed. The spring flexes, the arm then disengaes from the hammer, whereupon the unflexing of the spring throws the hammer against the gong.

2 Claims, 2 Drawing Figures

BELL ACTUATING MECHANISM

BACKGROUND OF THE INVENTION

This invention relates to an improved bell actuating mechanism. More specifically, this invention relates to an improved bell actuating mechanism in the combination of a spring driven motor having a winding shaft which rotates less than one complete revolution during the unwinding of the motor from a fully wound condition, escapement means for permitting the motor to unwind at a controlled rate and a bell to be struck immediately proximate to completion of unwinding of the motor.

Spring wound timer motors provided with bells are common. Many include complicated mechanisms. Some such mechanims have desirable features. However, they suffer the disadvantage of being relatively complex and, consequently, relatively expensive. In particular, a simple, reliable, inexpensive bell actuating mechanism for such devices is highly desired.

Typical of the prior art devices are those of U.S. Pat. Nos. 491,328, 2,583,245, 3,827,232 and 4,020,625.

In the alarm clock of U.S. Pat. No. 491,328, when the bell is turned in the direction in which the numbers increase, it will, when released, return to its first position, and the movement is so timed that it will take five minutes to return from the five marking, ten minutes from the ten marking and so on. Upon the return of the bell to its first or zero position, a hammer carried by a lever, pivoted to the base, is thrown toward the bell by means of a coiled spring. The lever and, consequently, the hammer, is actuated by engagement of a lug mounted upon the bell. The lug is hinged to the bell so that in winding up the bell, the lug may yield to pass over the lever but upon the return will bear forceably against the lever. While less complicated than some devices, this is a relatively expensive construction.

In the timing device of U.S. Pat. No. 2,583,245, when a pointer reaches the zero position, a shoulder defined by a sharp radial edge of the shoulder of a disc is disposed adjacent to a pin and permits the pin to drop off the sharp corner into notches of timing discs, the notches then being substantially aligned. This causes a lever to move under the biasing influence of a spring and impinge upon a clapper against a bell. This is a rather complicated and expensive arrangement.

In the spring driven timer of U.S. Pat. No. 3,827,232, at the end of the selected interval, a notch becomes aligned with a pin and a bellcrank is quickly rotated. As the bellcrank rotates, a foot supported thereon engages a hammer supported on a stud extending between upper and lower frame plates. A spring is wound about the stud and has one end hooked around the hammer and the other end trapped behind a leg, to maintain the hammer rotated fully in its counterclockwise direction against the foot. When the bellcrank rotates in a counterclockwise direction, the foot bears against the hammer, urging it in a clockwise direction, and causing it to rotate about its stud sharply against the inner surface of the bell. In this manner the bell is caused to sound when a timing cam has reached a certain position. This arrangement provides a ringing of longer duration than a single striking. This is achieved, however, only by means of a considerably complicated and expensive construction.

In the expanded scale timer of U.S. Pat. No. 4,020,625, a cam rotates in a counterclockwise direction until a drop surface of a notch moves under a follower and allows the follower to drop into the notch with a snap action under the influence of a biasing spring. This snap action develops considerable momentum in a relatively heavy lever and when the lever impacts on a stop, the momentum causes the lever to pivot about the stop and take up the overtravel available through a pin and slot connection of the lever, allowing a striker to hit a bell. Immediately after the motion is stopped by reason of the striker hitting the bell, the bias of the spring moves the lever clockwise about the stop and "takes back" the overtravel in the pin and slot connection and returns the lever to a predetermined position. This takes the striker off the bell immediately after impact and allows the bell to ring clearly whereas the bell would have a dead sound if the striker stayed on the bell. Here, again, is an arrangement of considerable complexity and expense.

It is, therefore, an object of the invention to provide a bell actuating mechanism which is reliable but simpler and less expensive than the mechanisms characteristic of the prior art.

Other objects and advantages of the invention will be apparent from the following description thereof.

SUMMARY OF THE INVENTION

According to the invention, there is provided an improved bell actuating mechanism in the combination of a spring driven motor having a winding shaft which rotates less than one complete revolution during the unwinding of the motor from a fully wound condition, escapement means for permitting the motor to unwind at a controlled rate and a bell to be struck immediately proximate to completion of unwinding of the motor. The improved bell actuating mechanism comprises a bell post coaxially mounted at one of its ends on the winding shaft for rotation with the winding shaft, means coaxially mounting a gong bell onto the other end of the bell post for rotation with the bell post and the winding shaft, a hammer for striking the bell, a spring mounting the hammer immediately adjacent an inner surface of the bell and an arm integral with and extending outwardly from the bell post for rotation with the bell post and the winding shaft. The path of movement of the arm intersects the hammer and the hammer is rotationally so positioned relative to the axis of the winding shaft and the bell post that the arm engages the hammer as the unwinding of the motor is completed. Consequently, as the unwinding of the motor is completed and the arm engages the hammer, the spring flexes until the flexure permits the arm to slide over the hammer whereupon unflexing of the spring throws the hammer against the inner surface of the gong. A single clean, sharp striking of the gong results, the spring immediately returning the hammer to its rest position.

In a preferred embodiment, a side of the arm facing away from the bell mounting end of the bell post for sliding over the hammer is inclined toward the bell mounting end of the bell post thereby to facilitate disengagement of the hammer.

DETAILED DESCRIPTION

Figure 2:
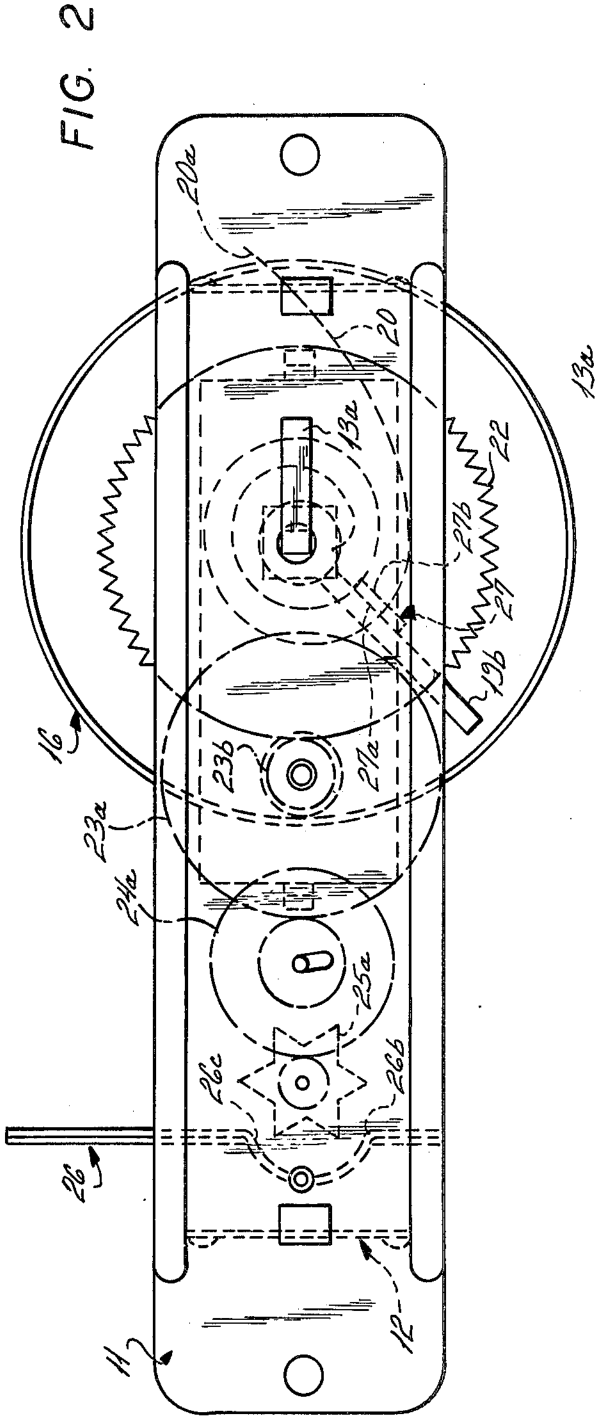
FIG. 2 is a plan view of the mechanism of FIG. 1.

The mechanism is supported by a top housing 11 and a bottom housing 12. A winding shaft 13 passes through respective holes in the housings 11 and 12. One end of the shaft is bent at a right angle to form a handle portion **13*a* to facilitate manual turning of the shaft. On the other end of the shaft 13 is coaxially mounted a bell post 14 one end of which receives the square cross sectioned shaft 13 for rotation of the bell post 14 with the shaft 13. Coaxially mounted onto the other end of the bell post 14 by means of a button 15 having a shaft 15*a* tightly received in the bell post 14 is a gong bell 16, which rotates with the bell post 14 and the winding shaft 13. A coil spring 17 one end of which is fastened to the housing 12 carries at its other end a bell hammer 18 immediately adjacent an inner surface of the bell 16. An arm 19 is integral with and extends outwardly from the bell post 14 for rotation with the bell post 14 and the winding shaft 13**.

Between the housings 11 and 12 is contained the works of a spring driven motor having escapement means for permitting the motor to unwind at a controlled rate. These works will now be described. A spiral spring 20 powers the motor. The inner end of the spring 20 is fixed to a block 21 mounted on the shaft 13 for rotation with the shaft 13. The outer end of the spring 20 is held in place by being received through a slot in side wall **12*a* of the housing 12 and being provided with ears 20*a* which prevent the spring end from being withdrawn through the slot. Also mounted on the shaft 13 for rotation with the shaft 13 and the bell post 14 is a gear 22 having sixty teeth. Rotationally mounted adjacent thereto is an integral piece 23 having a forty-eight tooth gear portion 23*a*, a ten-tooth pinion portion 23 *b* and, the balance, a shaft portion 23*c* of varying diameter. The gear 22 and the pinion 23*b* mesh. Rotationally mounted adjacent the piece 23 is another integral piece 24, having a thirty-tooth gear portion 24*a*, a ten-tooth pinion portion 24*b* and, the balance, a shaft portion 24*c* of varying diameter. The gear 23*a* and the pinion 24*b* mesh. Adjacent thereto is another integral piece 25, having a six-tooth star wheel portion 25*a* and a six-tooth pinion portion 25*b*, the balance being shaft portion 25*c* of varying diameter. The pinion 25*b* and the gear 24*a* mesh. A governor 26 is pivotally mounted adjacent the piece 25 by means of pivot ears 26*a* formed on the governor 26. It will, of course, be understood that opposite ends of the shaft 23*c*, the shaft 24*c*, the shaft 25*c* and the respective ears 26*a* of the governor 26 are rotatably received in respective openings in the housings 11 and 12. The points of the star wheel 25*a* engage the portions 26*b* and 26*c* of the governor 26 when the star wheel 25*a* rotates in the direction which is clockwise as viewed in FIG. 2**.

Figure 1:
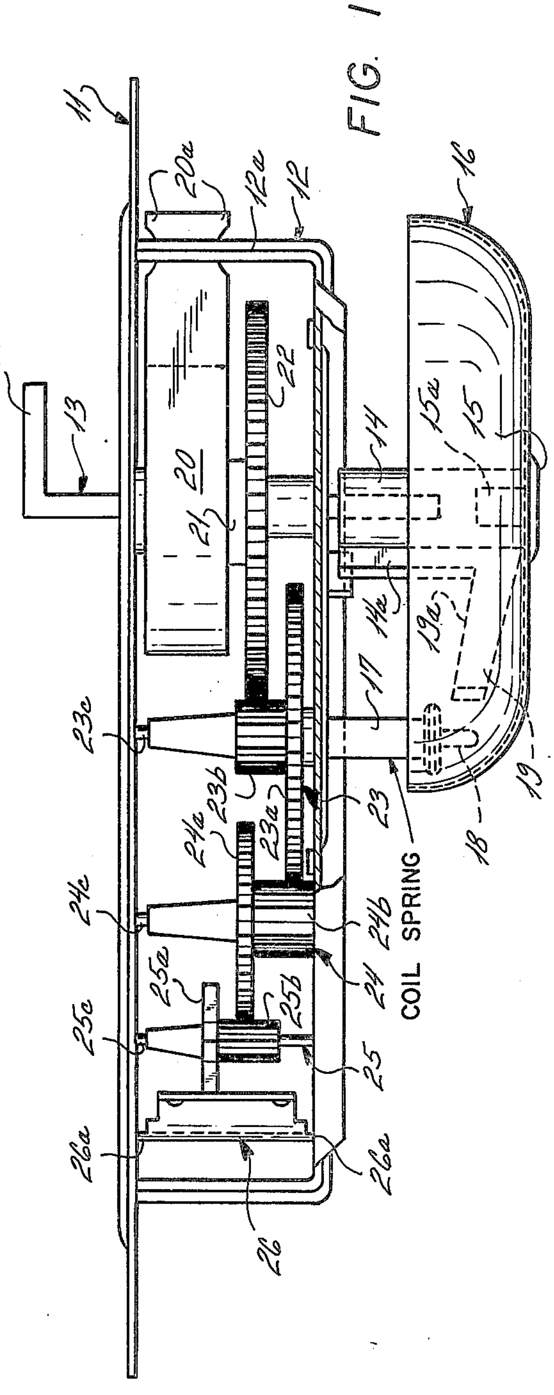
FIG. 1 is a side elevation, partly in section, of a mechanism according to the invention.

The bell post 14 includes a longitudinal rib **14*a*. The spring 20 imparts, as viewed in Fig. 2, a counterclockwise force to the shaft 13. A stop 27 formed on the housing 12, and against which the rib 14*a* abuts, maintains the spring in a partly wound condition before the motor is wound up and limits the winding and subsequent unwinding of the motor to slightly less than one complete revolution of the shaft 13. In FIG. 2, the motor is in an unwound condition, with the rib 14*a* abutting against the face 27*a* of the stop 27. In FIG. 1, the motor is in a fully wound condition with the rib 14*a* abutting against the opposite face 27*b* of the stop 27. The motor can be wound either by means of the shaft handle 13*a* or by means of the bell 16. The path of movement of the arm 19 intersects the hammer 18. When the motor is wound by rotating the shaft in the clockwise direction as viewed in FIG. 2 until the rib 14*a* abuts against the stop face 27*b*, the arm 19 engages the hammer 18 but is then able to pass the hammer 18 because the spring 17 on which the hammer 18 is mounted yields. The hammer strikes the bell due to this engagement but this is merely incidental, no function being served thereby. As the spring 20 unwinds, it rotates the shaft 13 and, consequently, the arm 19 in the counterclockwise direction. As the unwinding of the motor is completed, i.e., as the rib 14*a* completes moving toward the stop face 27*a*, arm 19 again engages the hammer 18, the spring 17 flexes until the flexure permits the arm to slide over the hammer 18 whereupon unflexing of the spring 17 throws the hammer 18 against the inner surface of the bell 16. The side 19*a* of the arm 19, which side faces away from the bell mounting end of the bell post 14 and slides over the hammer 18 as the arm 19 disengages from the hammer 18, is inclined toward the bell mounting end of the bell post 14 thereby to facilitate the disengagement of the hammer 18. More specifically, during the engagement of the hammer 18 by the arm 19, the hammer 18 moves along the leading face 19*b* of the arm 19 toward the bell post 14, until the combination of the shortening of the vertical spacing of the hammer 18 from the housing 12 due to the increasing flexure of the spring 17 and increasing vertical spacing from the side 19*a* to the housing 12 as the side 19*a* approaches the bell post 14 permits the side 19*a* to slide over the free end of the hammer 18, which disengages the arm 19 from the hammer 18. The spring 17 returns the hammer 18 to its rest position. Hence, a single sharp striking of the bell 16** has been effected.

The governor 26 and the star wheel **25*a* together comprise an escapement means which, through the above-described gear and pinion train, control the rate at which the motor unwinds. The entire mechanism is, therefore, suitable for use as a timer. The particular embodiment illustrated was designed as a one-minute timer. By adding weights to the governor 26**, the time period for unwinding of the motor can be increased to a few minutes. By increasing the number of gears and pinions, the time interval can be yet further increased.

While the invention has been specifically described by reference to a particular embodiment, it is to be understood that the scope of the invention, as defined by the hereto appended claims, is intended to include all obvious modifications and variations.

What is claimed is:

1. In the combination of a spring driven motor having a winding shaft which rotates less than one complete revolution during the unwinding of the motor from a fully wound condition, escapement means for permitting the motor to unwind at a controlled rate and a bell to be struck immediately proximate to completion of unwinding of the motor, an improved bell actuating mechanism comprising a bell post coaxially mounted at one of its ends on the winding shaft for rotation with the winding shaft, means coaxially mounting a gong bell onto the other end of the bell post for rotation with the bell post and winding shaft, a hammer for striking the bell, a spring mounting the hammer immediately adjacent an inner surface of the bell, an end of the spring remote from the bell being fixed relative to the bell, an arm integral with and extending outwardly from the bell post for rotation with the bell post and winding shaft, the path of movement of the arm intersecting the hammer and the hammer being rotationally so positioned relative to the axis of the winding shaft and the bell post that the arm engages the hammer as the unwinding of the motor is completed, the arm being so shaped as to facilitate disengagement of the hammer, whereby as the unwinding of the motor is completed and the arm engages the hammer, the spring flexes until the flexure permits the arm to slide over the hammer whereupon unflexing of the spring throws the hammer against the inner surface of the bell.

2. In the combination according to claim 1, in which the arm has a side facing away from the bell mounting end of the bell post for sliding over the hammer, said side being inclined toward the free end of the bell post thereby to facilitate disengagement of the hammer.

* * * * *